Figure 1:
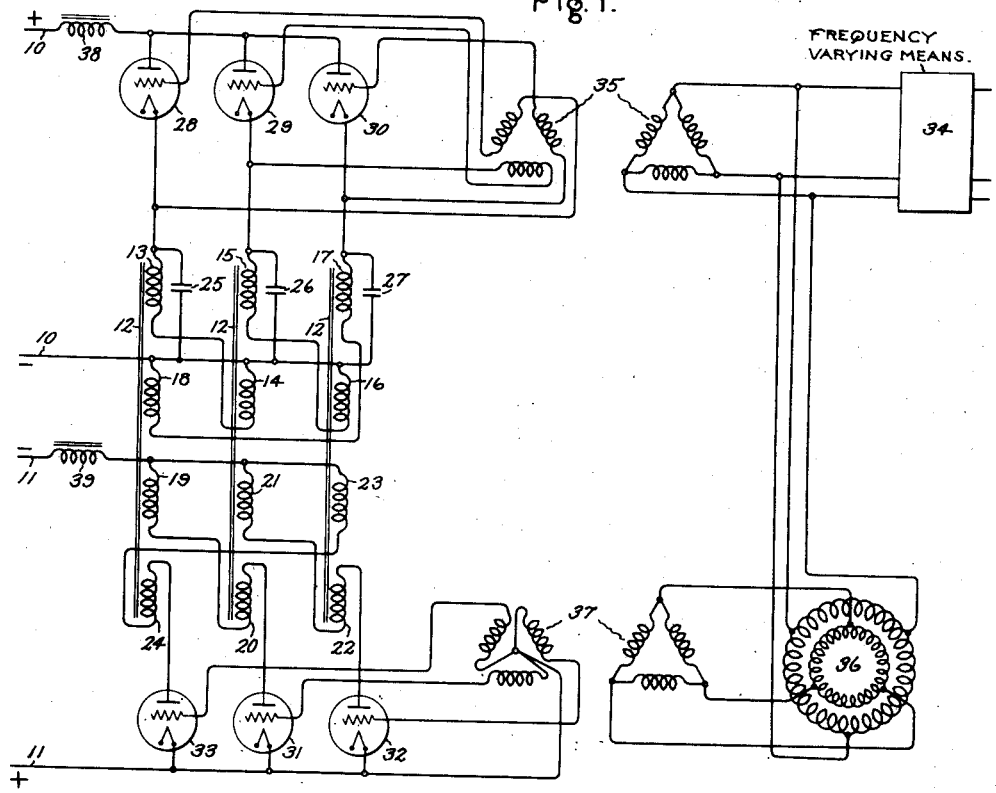

Oct. 5, 1937.  C. C. HERSKIND  2,094,793
ELECTRIC VALVE CONVERTING SYSTEM
Original Filed July 8, 1936  2 Sheets—Sheet 1

Inventor:
Carl. C. Herskind,
by Harry E. Dunham
His Attorney.

Oct. 5, 1937.  C. C. HERSKIND  2,094,793
ELECTRIC VALVE CONVERTING SYSTEM
Original Filed July 8, 1936   2 Sheets-Sheet 2

Inventor:
Carl C. Herskind,
by Harry E. Dunham
His Attorney.

Patented Oct. 5, 1937

2,094,793

UNITED STATES PATENT OFFICE 2,094,793

ELECTRIC VALVE CONVERTING SYSTEM

Carl C. Herskind, Scotia, N. Y., assignor to General Electric Company, a corporation of New York Application July 8, 1936, Serial No. 89,600
Renewed May 21, 1937

11 Claims. (Cl. 171—97)

My invention relates to electric valve converting systems and more particularly to such systems suitable for transmitting energy from one direct current circuit to another.

An electric valve converting system suitable for transferring energy between two direct current circuits is disclosed in United States Letters Patent No. 1,961,080, granted May 29, 1934, upon the application of C. A. Sabbah for improvements in an Electric valve converting system. The system disclosed therein utilizes an energy storage and transfer device comprising a multi-legged reactor provided with a single inductive winding on each leg thereof and having associated capacitors each connected across at least a portion of said effective winding to maintain the total magnetomotive force of the core structure and that of each leg thereof substantially constant.

In certain instances it might be desirable to provide a similar system which would not necessitate the use of the multi-legged reactor, or an arrangement wherein it is not necessary that the total magnetomotive force of the core structure and that of each of the legs thereof is to be maintained substantially constant. Furthermore, in such instances where the direct current potential appearing across the direct current input circuit is relatively high compared to the direct current potentials appearing across the constant current direct current output circuit it would be desirable to provide two independent circuits.

It is therefore an object of my invention to provide an improved electric valve converting system for transferring energy between a direct current circuit and a constant current circuit which will overcome the above mentioned disadvantages of the arrangement of the prior art, and which will be simple and reliable in operation.

It is a further object of my invention to provide an improved electric valve converting system for transferring energy between a direct current circuit and a constant current circuit in which the effects of the unidirectional components of magnetomotive force induced by current in the windings are eliminated.

It is a further object of my invention to provide an improved electric valve converting system for transferring energy between a constant potential direct current circuit and a constant current direct current circuit each of which is independent of the other.

Figure 2:
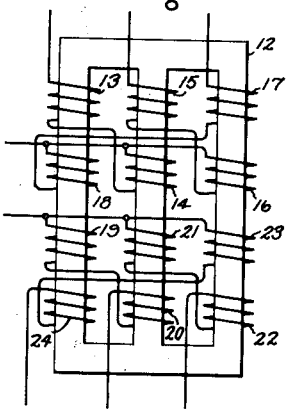
Figure 3:
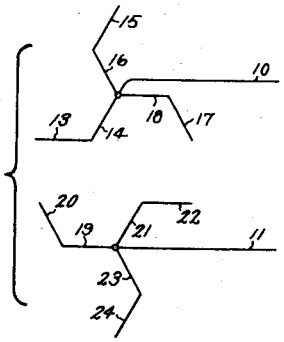
Figure 4:
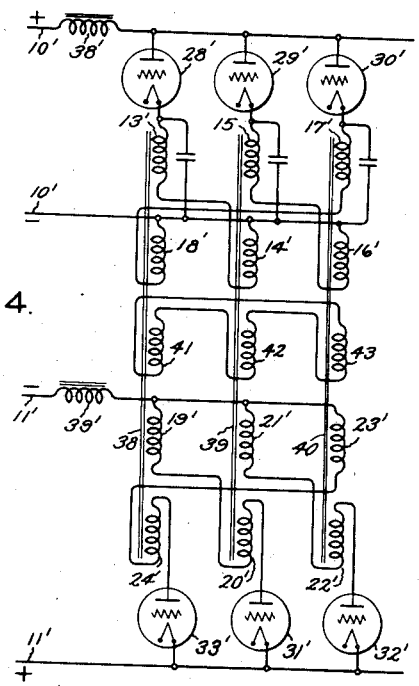
Figure 5:
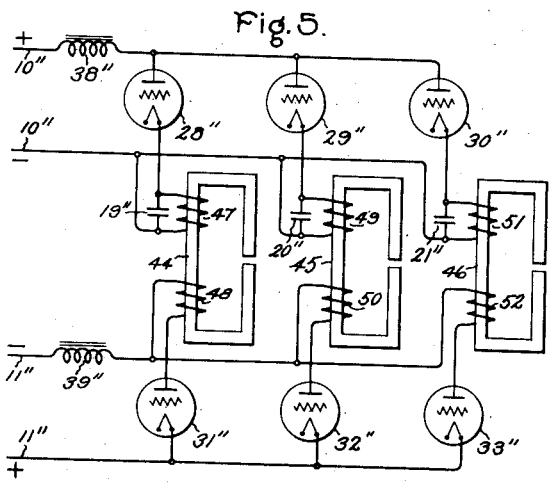

The novel features which are believed to be characteristic of my invention are set forth with particularity in the appended claims. My invention itself, however, both as to its organization and method of operation, together with further objects and advantages thereof, will be better understood by reference to the following description taken in connection with the accompanying drawings in which Fig. 1 shows an electric valve converting system embodying my invention; Fig. 2 represents a structural detail of a system of Fig. 1; Fig. 3 shows the voltage relation of the winding disclosed in Fig. 2; and Figs. 4 and 5 show other modifications embodying my invention.

Referring now more particularly to Fig. 1 of the drawings, there is illustrated an arrangement embodying my invention for transferring energy between a constant potential direct current circuit 10 and a constant current direct current circuit 11. This system is provided with an energy storage and transfer device comprising a three-legged magnetic core structure 12 shown in detail in Fig. 2, having inductive windings 13 to 20 on the legs thereof. The inductive windings 13 and 14; 15 and 16; 17 and 18 are connected together so as to form upon the three-legged magnetic core structure 12 a zigzag or staggered winding arrangement. The windings 13 and 14; 15 and 16; 17 and 18 are provided with energy storage devices which may be in the form of capacitors 25, 26 and 27 connected in parallel with the inductive windings respectively, so that together with the windings they form energy storage circuits. The windings 19 and 20; 21 and 22; 23 and 24 are also connected together so as to form upon the core structure 12 a staggered or zigzag winding arrangement. The purpose of these zigzag or staggered winding arrangements is to eliminate the effect of the unidirectional magnetomotive forces induced by current flowing in these windings. The upper terminals of the windings 13, 15 and 17 are connected respectively to the direct current circuit 10 by an electric discharge valve means illustrated as the valves 28, 29 and 30. The upper terminals of the windings 14, 16 and 18 are interconnected to the lower conductor of the direct current circuit 10. The upper terminals of the windings 19, 21 and 23 are each connected to the upper terminal of the direct current circuit 11 while the upper terminals of the windings 20, 22 and 24 are each connected by an electric discharge valve means illustrated as the valves 31, 32 and 33 to the lower terminal of the direct current circuit 11. While each of the valves 26 to 33 is shown as being provided with an anode, a cathode and a control grid, these valves may be any of the several types well known in the art, although it is preferable to utilize valves of the type containing an ionizable medium and which are provided with a control or starting electrode whereby the discharge paths between the anodes and cathodes may be controlled. The control electrodes of the valves 28, 29 and 30 are energized from a suitable source of alternating potential 34 by means of a three-phase transformer 35 the secondary windings of which form part of the grid circuits of these valves. This alternating potential is preferably derived from a means provided with some arrangement for readily varying the frequency of the alternating current. The control electrodes of the valves 31, 32 and 33 are energized from the same source of alternating current 34 through a phase shifting device 36 and the three-phase transformer 37, the secondary windings of which are part of the grid circuits of these valves. It will be apparent to those skilled in the art that each of the grid circuits of these valves may be provided with current limiting resistors as is common practice in the art. In order to prevent any interaction between the electric valve converting system and the direct current circuit, smoothing reactors 38 and 39 may be connected between the direct current circuits 10 and 11, and the valve apparatus. It will also be apparent to those skilled in the art that instead of connecting the capacitors 25, 26 and 27 across the inductive windings 13, 14; 15, 16; 17, 18 other energy storage devices or circuits may be arranged to serve the same purpose.

By referring to the vector diagram shown in Fig. 3 it will be apparent that the unidirectional component of magnetomotive force induced by current flowing through the winding 13 will be neutralized by a component of unidirectional magnetomotive force induced by current flowing through the winding 19. The other relationships will become apparent in the description of the operation of the apparatus.

In operation, each of the electric valves 28 to 33 is conductive for 120 electrical degrees of each cycle, these valves becoming conductive in predetermined sequence at a frequency determined by the frequency of the alternating current source 34 from which the control electrodes or grids are energized. In order to operate this system properly to transfer energy from circuit 10 to circuit 11, the phase relation between the grid excitation of the valves 28, 29 and 30 and the valves 31, 32 and 33 must be such that the valves in the lower group become conductive in advance of the corresponding valves of the upper group. This angle of advance between the excitation of the two corresponding valves, as for example between valves 28 and 31, will lie between any value just greater than 0 degree and slightly less than 180 degrees. The phase shifting device 36 provides the means for obtaining this phase difference, and it also may be operated as a control for determining the amount of energy transferred between the two direct current circuits. The voltage relation and power transfer relation between the two direct current circuits is also dependent upon the ratio between the windings of the upper group of valves and the lower group of valves; the size of the capacitors 25, 26 and 27; the frequency of the alternating current potential applied upon the control electrodes of the discharge devices as derived from the alternating current source 34; and the phase relation between the excitation of the groups of control electrodes of the valves 28, 29, 30 and 31, 32, 33.

The function performed in the operation of the system by the core structure 12 of the windings 13, 14; 15, 16; 17, 18 and the associated capacitors 25, 26 and 27 perhaps will be clarified by the following example of one cycle of operation of the electric valves 28 and 31 which are inductively associated together with the windings 13 and 19 of one leg of the core structure. If we assume, for example, that the grid excitation supplied to the control electrodes of the valves 28 and 31 differs by a phase difference of 120 degrees, the valve 31 will be conductive for 120 electrical degrees and meanwhile the valve 28 will be in a non-conductive condition. The capacitor 25 having been charged to a certain potential by previous operation, now discharges into windings 13, 14 and by induction this energy is transferred to winding 19 to supply energy to the valve 31. At the end of the period of conductivity of the valve 31 the valve 28 becomes conductive and the valve 31 is non-conductive. The current transmitted by the valve 28 during this period of conductivity serves to store energy in a circuit comprising the windings 13, 14 and the capacitor 25. At the end of the period of conductivity of the valve 28, the current is transferred to one of the other valves such as 29 or 30, and during the next 120 electrical degrees both the valves 28 and 31 remain non-conductive. During this period when both of these valves are nonconductive the capacitor 25 discharges into the windings 13, 14 in order to produce a unidirectional component of magnetomotive force to neutralize or render ineffective the component of magnetomotive force introduced into that leg by the winding 18. It is believed that it will be apparent to those skilled in the art that the capacitors 25, 26, 27 not only provide commutating potentials to transfer current between the valves 28, 29 and 30, but also operate as energy storage devices to supply current to the anodes of valves 30, 31, and 32. For purposes of explanation, the operation of the system has been described as transferring energy from the constant potential direct current circuit 10 to the constant current direct current circuit 11, but it will be apparent that the energy transfers may occur in the opposite direction. It furthermore will also be apparent to those skilled in the art that by providing means for varying the frequency of the alternating current source 34, the transfer of energy between the two circuits may be readily controlled as well as by controlling direct through the means of the phase shifting device 36.

Referring now to Fig. 4 of the drawings, there is disclosed therein an arrangement utilizing a plurality of single phase transformer structures in place of the three-legged core structure 12 of Fig. 1. Since the remaining components of the circuit correspond to the elements of Fig. 1 they are indicated by reference characters which are primed. While three single phase transformer core structures 38, 39 and 40 have been utilized, it is necessary to provide each of these structures with an additional winding 41, 42 and 43, respectively. These windings 41, 42 and 43 are all connected in series so as to form a loop circuit which by its conductive and inductive relationship to the windings of the transformer structures will operate to equalize any inequality which may arise in manufacture and also to serve to function similar to the magnetic circuit linking the three legs of the core structure of Figs. 1 and 2. It will be apparent that the arrangement shown in this figure operates in substantially the same manner as the arrangement in Fig. 1 and hence further explanation thereof is believed to be unnecessary.

Referring now to Fig. 5 of the drawings there is illustrated a further modification embodying my invention for transferring energy between the direct current circuits 10" and 11". This system is provided with an energy storage and transfer device comprising three open cored reactors each having a magnetic structure in which there is an air gap. These magnetic structures 44, 45 and 46 are each provided with a pair of inductive windings 47, 48; 49, 50; and 51, 52. One winding of each of the pairs of inductive windings is provided with an energy storage device which may be in the form of the capacitors 19", 20", 21" connected in parallel with the winding. The windings 47, 49 and 51 are each connected at one extremity to direct current circuit 10" and at the other extremity by means of electric valves 28", 29" and 30" to the other side of the direct current circuit 10". One extremity of each of the windings 48, 50 and 52 is connected to one side of the direct current circuit 11" and the remaining terminals of these windings are connected through the valves 31", 32" and 33" to the other side of the direct current circuit 11". Since each of the magnetic structures 44, 45 and 46 are provided with an air gap, these air gaps operate to prevent a cumulative effect of the unidirectional component of magnetomotive force introduced into these core structures by current flowing through the windings. It is believed it will be apparent to those skilled in the art that the inductive windings 47, 49 and 51 together with their associated capacitors form energy storage and transfer circuits which operate in a manner similar to the operation set forth for the circuit arrangement disclosed in Fig. 1.

While I have shown and described my invention in connection with certain specific embodiments it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent in the United States is:

1. An electric valve converting system for transferring energy between direct current circuits comprising a plurality of energy storage circuits connected through an electric discharge valve means to one of said direct current circuits, a plurality of inductive windings, an electric discharge valve means connecting said windings with the other of said direct current circuits, magnetic core means for coupling said energy storage circuits to said inductive windings, means for eliminating the effect of the unidirectional components of magnetomotive force in said core means, and means for controlling the sequence of the conductivities of said valve means.

2. An electric valve converting system for transferring energy between direct current circuits, one of which has a constant current characteristic, comprising a plurality of inductive windings connected through an electric discharge valve means to one of said circuits, a plurality of energy storage devices each connected to a different one of said windings, a plurality of inductive windings connected through an electric discharge valve means to the other of said circuits, magnetic core means for coupling said first inductive windings to said second inductive windings, means for eliminating the effects of the unidirectional components of magnetomotive force in said core means, and means for controlling the frequency of and the instants of conductivity of said valve means.

3. An electric valve converting system for transferring energy between direct current circuits, one of which has a constant current characteristic, comprising a plurality of inductive windings connected through an electric discharge valve means to one of said circuits, a plurality of capacitors each connected across a different one of said windings, a plurality of inductive windings connected through an electric discharge valve means to the other of said circuits, magnetic core means for coupling said first windings to said second windings, means for eliminating the effects of the unidirectional components of magnetomotive force generated by current in said windings, means for controlling the conductivities of said valve means, and means for shifting the instant of conductivity of the valve means associated with one of said circuits with respect to the valve means associated with the other of said circuits.

4. An electric valve converting system for transferring energy between a direct current circuit and a constant current circuit comprising a polyphase core structure provided with two groups of windings, a plurality of energy storage devices associated with one group of said windings, means including electric discharge valve means for interconnecting said windings with said circuits, said windings being arranged in staggered formation to prevent the generation of unidirectional components of magnetomotive force in said core structure, and means for controlling the conductivities of said electric valve means.

5. An electric valve converting system for transferring energy between direct current circuits comprising a plurality of magnetic core structures, a plurality of energy storage circuits associated with said structures, means including an electric discharge valve means for interconnecting said energy storage circuits with one of said direct current circuits, a plurality of inductive windings associated with said structures, means including an electric discharge valve means for interconnecting said windings with the other of said direct current circuits, means for rendering ineffective the unidirectional magnetomotive forces generated by currents flowing through said energy storage circuits and said inductive windings, and means for controlling the conductivities of said valve means.

6. An electric valve converting system for transferring energy between direct current circuits, one of which has a constant current characteristic, comprising a plurality of inductive windings connected through an electric discharge valve means to one of said circuits, a plurality of energy storage devices each connected to a different one of said windings, a plurality of inductive windings connected through an electric discharge valve means to the other of said circuits, a plurality of magnetic core means for coupling said first inductive windings to said second inductive windings, means for eliminating the effects of the unidirectional components of magnetomotive force in said core means, and means for controlling the conductivity of said valve means.

7. An electric valve converting system for transferring energy between direct current circuits, one of which has a constant current characteristic, comprising a plurality of inductive windings connected through an electric discharge valve means to one of said circuits, a plurality of capacitors each connected across a different one of said windings, a plurality of inductive windings connected through an electric discharge valve means to the other of said circuits, a plurality of magnetic core means for coupling said first winding to said second winding, means for eliminating the effects of the unidirectional component of magnetomotive force generated by current in said windings, means for controlling the conductivities of said valve means, and means for shifting the instant of conductivity of the valve means associated with one of said circuits with respect to the valve means associated with the other of said circuits.

8. An electric valve converting system for transferring energy between a direct current circuit and a constant current circuit comprising two groups of inductive windings, a plurality of energy storage devices associated with one group of said windings, means including electric discharge valve means for interconnecting said windings with said circuit, magnetic core means for coupling together said groups of windings, said windings being arranged in staggered formation to prevent the generation of unidirectional components of magnetomotive force in said core means, and means for controlling the conductivities of said valve means.

9. An electric valve converting system for transferring energy between a direct current circuit and a constant current circuit comprising a plurality of magnetic core structures, a group of inductive windings arranged in staggered formation on said core structures, a plurality of capacitors connected to said windings to form energy storage circuits, means including an electric discharge valve means for connecting said windings to one of said circuits, a second group of inductive windings arranged in staggered formation on said core structures, means including an electric discharge valve means connecting said latter windings to the other of said circuits, a plurality of inductive windings each arranged on a different one of said core structures, said windings all being connected in series, and means for controlling the conductivities of said electric valve means.

10. An electric valve converting system for transferring energy between a direct current circuit and a constant current circuit comprising a plurality of pairs of inductive windings, a plurality of energy storage devices each associated with one winding of said pairs of windings, means including an electric discharge valve means for interconnecting said windings with said circuits, means including a plurality of open magnetic core structures for said pairs of windings to eliminate the effect of unidirectional components of magnetomotive force induced in said structures, and means for controlling the sequence of the conductivities of said valve means.

11. An electric valve converting system for transferring energy between direct current circuits, one of which has a constant current characteristic, comprising a plurality of pairs of inductive windings, a plurality of capacitors each connected across one winding of said pairs of windings, means including an electric discharge valve means for interconnecting said windings with said circuits, means including a plurality of open magnetic core structures for said pairs of windings to eliminate the effect of unidirectional components of magnetomotive force induced in said structures, and means for controlling the sequence and the frequency of the conductivities of said valve means.

CARL C. HERSKIND.